(12) United States Patent
Ishii et al.

(10) Patent No.: US 10,011,315 B2
(45) Date of Patent: Jul. 3, 2018

(54) STRADDLE-TYPE VEHICLE

(71) Applicant: Kawasaki Jukogyo Kabushiki Kaisha, Kobe-shi, Hyogo (JP)

(72) Inventors: Hiroshi Ishii, Kobe (JP); Daisuke Saeki, Kobe (JP); Tomo Yamamoto, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 89 days.

(21) Appl. No.: 14/975,447

(22) Filed: Dec. 18, 2015

(65) Prior Publication Data
US 2016/0176467 A1   Jun. 23, 2016

(30) Foreign Application Priority Data

Dec. 19, 2014   (JP) .................................. 2014-257144

(51) Int. Cl.
| | |
|---|---|
| *B62K 11/04* | (2006.01) |
| *B62K 11/14* | (2006.01) |
| *B62J 29/00* | (2006.01) |
| *B62K 19/30* | (2006.01) |
| *B62J 17/02* | (2006.01) |
| *F02M 35/16* | (2006.01) |

(52) U.S. Cl.
CPC ............... *B62K 11/14* (2013.01); *B62J 17/02* (2013.01); *B62J 29/00* (2013.01); *B62K 11/04* (2013.01); *B62K 19/30* (2013.01); *F02M 35/162* (2013.01)

(58) Field of Classification Search
CPC ......... B62K 11/02; B62K 11/04; B62K 11/14; B62J 29/00
See application file for complete search history.

(56) References Cited

U.S. PATENT DOCUMENTS

| | | | | |
|---|---|---|---|---|
| 4,032,168 A | * | 6/1977 | Emerson ................ | B62K 11/14 280/279 |
| 4,204,585 A | * | 5/1980 | Tsuboi ................... | B62K 11/04 123/184.45 |
| 4,570,740 A | * | 2/1986 | Hara ........................ | B62J 17/00 180/229 |

(Continued)

FOREIGN PATENT DOCUMENTS

| | | | | |
|---|---|---|---|---|
| EP | 2033886 A2 | * | 3/2009 | .............. B62J 29/00 |
| EP | 2033886 A2 | | 3/2009 | |

(Continued)

OTHER PUBLICATIONS

European Patent Office, Extended European Search Report Issued in Application No. 15201178.9, dated May 6, 2016, Germany, 8 pages.

*Primary Examiner* — Joseph M Rocca
*Assistant Examiner* — Maurice L Williams
(74) *Attorney, Agent, or Firm* — Alleman Hall Creasman & Tuttle LLP

(57) ABSTRACT

A straddle-type vehicle comprises a vehicle body frame including a head pipe, and a front frame extending rearward from the head pipe; a motor placed below the front frame and supported on the front frame; a control device which controls the motor; and a support member placed in front of the head pipe, the control device being fastened to the support member.

7 Claims, 5 Drawing Sheets

(56) References Cited

U.S. PATENT DOCUMENTS

| | | | | |
|---|---|---|---|---|
| 4,687,072 | A * | 8/1987 | Komuro | B62J 6/001 180/219 |
| 4,796,716 | A * | 1/1989 | Masuda | B60K 31/06 180/170 |
| 6,396,394 | B1 * | 5/2002 | Suzuki | B60K 35/00 340/425.5 |
| 6,585,067 | B2 * | 7/2003 | Tsuji | B62J 99/00 180/219 |
| 9,434,437 | B2 * | 9/2016 | Van Dyke | B60T 11/22 |
| 9,840,306 | B2 * | 12/2017 | Matsuda | B62M 7/02 |
| 2002/0007977 | A1 * | 1/2002 | Ishii | B62J 17/00 180/219 |
| 2004/0264204 | A1 * | 12/2004 | Toyofuku | B62J 17/00 362/473 |
| 2005/0267674 | A1 * | 12/2005 | Suzuki | G01C 21/26 701/444 |
| 2008/0203698 | A1 * | 8/2008 | Suita | B62K 11/14 280/276 |
| 2008/0298078 | A1 * | 12/2008 | Miyamoto | B62J 6/02 362/474 |
| 2009/0021582 | A1 * | 1/2009 | Nakaya | B60R 1/00 348/148 |
| 2009/0038432 | A1 * | 2/2009 | Shimizu | B62J 17/02 74/551.8 |
| 2009/0141377 | A1 * | 6/2009 | Kobayashi | B62J 29/00 359/841 |
| 2010/0025140 | A1 * | 2/2010 | Takenaka | B62K 11/14 180/219 |
| 2011/0246024 | A1 * | 10/2011 | Hattori | B62J 99/00 701/36 |
| 2012/0267182 | A1 * | 10/2012 | Saeki | B62K 19/30 180/219 |
| 2013/0002418 | A1 * | 1/2013 | Nakamura | B60K 35/00 340/441 |
| 2013/0306391 | A1 * | 11/2013 | Kontani | B62K 11/00 180/219 |
| 2015/0251540 | A1 * | 9/2015 | Matsuda | B60L 11/1822 701/22 |
| 2017/0001674 | A1 * | 1/2017 | Ishii | B62J 6/02 |

FOREIGN PATENT DOCUMENTS

| | | | | |
|---|---|---|---|---|
| EP | 2036805 | A1 | 3/2009 | |
| EP | 2669161 | A1 * | 12/2013 | B60Q 1/12 |
| EP | 2949555 | A1 * | 12/2015 | B62J 6/005 |
| JP | 2000190887 | A | 7/2000 | |
| JP | 2005343227 | A * | 12/2005 | B62K 11/14 |
| JP | 2010195254 | A | 9/2010 | |
| JP | 2011046291 | A * | 3/2011 | B60K 37/02 |
| JP | 2012030705 | A | 2/2012 | |
| JP | 2012051443 | A * | 3/2012 | B62H 5/00 |
| JP | 2014097798 | A * | 5/2014 | B62J 11/00 |
| WO | WO-2014054069 | A1 * | 4/2014 | B60L 11/1822 |

\* cited by examiner

STRADDLE-TYPE VEHICLE

CROSS-REFERENCE TO THE RELATED APPLICATION

This application claims priority to and the benefit of Japanese Patent Application No. 2014-257144, filed on Dec. 19, 2014, the entire disclosure of which is incorporated herein by reference.

BACKGROUND OF THE INVENTION

Field of the Invention

The present invention relates to a straddle-type vehicle.

Description of the Related Art

In a straddle-type vehicle, it is necessary to ensure a space in which electric components such as a control unit for controlling a motor and a fuse box, or other components and devices, which are mounted to a vehicle body, are placed. For example, Japanese Laid-Open Patent Application Publication No. 2012-30705 discloses a configuration in which a control unit is placed in a location that is lateral relative to an air cleaner box.

SUMMARY OF THE INVENTION

However, the space occupied by the control unit reduces a component accommodating space surrounded by vehicle body frames. If the control unit is placed in a space below a seat, then it becomes difficult to ensure in the space below the seat, the space in which the electric components or other components and devices, which are mounted to the vehicle body, are placed. Under the circumstances, it is difficult to flexibly design the layout of the components and the devices which are mounted to the vehicle body.

The present invention is directed to solving the above-described problem. An object of the present invention is to more flexibly design the layout of the components and the devices which are mounted to the vehicle body, in the straddle-type vehicle.

According to an aspect of the present invention, a straddle-type vehicle comprises a vehicle body frame including a head pipe, and a front frame extending rearward from the head pipe; a motor placed below the front frame and supported on the front frame; a control device which controls the motor; and a support member placed in front of the head pipe, the control device being fastened to the support member.

In accordance with this configuration, since the control device which controls the motor is fastened to the support member placed in front of the head pipe, it becomes easier to ensure a space in which electric components or devices, which are mounted to the vehicle body, are placed, in a space defined by the vehicle body frame. As a result, it becomes possible to more flexibly design the layout of the components and the devices which are mounted to the vehicle body, in the straddle-type vehicle.

The above straddle-type vehicle may further comprise a meter device fastened to the support member.

In accordance with this configuration, since the meter device and the control device are fastened to the support member which is a common member, the number of components can be reduced.

The above straddle-type vehicle may further comprise: a side mirror fastened to the support member.

In accordance with this configuration, since the side mirror is also fastened to the support member which is the common member, the number of components can be further reduced.

In the above straddle-type vehicle, the support member may be formed with a section for supporting the control device, at an end portion of the support member on one side in a vehicle width direction.

In accordance with this configuration, since the control device can be fastened to the support member in a location that is outward in the vehicle width direction, an interference between the control device and other components or devices can be prevented.

The above straddle-type vehicle may further comprise: a side cowling which is mounted to the vehicle body frame and covers a vehicle body from outside in a vehicle width direction, and the control device may be placed above the side cowling.

In accordance with this configuration, since the control device is placed above the side cowling mounted to the vehicle body frame, the control device is located to be distant from the motor in a vertical direction. Therefore, the effects of heat radiated from the engine on the control device can be suppressed more effectively.

The above straddle-type vehicle may further comprise a connection member fastened to the support member and electrically connected to the control device.

In accordance with this configuration, since the connection member is fastened to the support member in addition to the control device, it becomes possible to ensure a space in which other electric components and devices mounted to the vehicle body are placed in a location that is rearward relative to the head pipe, in the space defined by the vehicle body frame.

In the above straddle-type vehicle, the connection member of a plate shape may be placed on a reverse surface of the support member which is on an opposite side of a display surface of a meter device, along the meter device.

In accordance with this configuration, since the connection member of the plate shape is placed on the reverse surface of the support member which is on an opposite side of the display surface of the meter device, along the meter device, the connection member can be fastened to the support member in a compact manner.

In the above straddle-type vehicle, the motor may be an engine, and the straddle-type vehicle may further comprise a supercharger which compresses air to be supplied to the engine.

In the straddle-type vehicle incorporating the supercharger, the air compressed by the supercharger is supplied to the engine, and thereby an engine output is increased. For this reason, the temperature of the heat radiated from the engine is increased. In accordance with the above configuration, since the control device is fastened to the support member located in front of the head pipe, a temperature increase in the control device, which would be caused by the heat radiated from the engine, can be suppressed. In addition, because of the layout in which the control device is placed in front of the head pipe, a load distributed to a front wheel can be increased. As a result, it becomes possible to improve the stability of the straddle-type vehicle incorporating the supercharger, which generates a large engine output.

According to another aspect of the present invention, a straddle-type vehicle comprises a head pipe; a vehicle body frame extending rearward from the head pipe; a driving power source which is mounted to the vehicle body frame and generates driving power for moving a vehicle body; a support member which is placed in front of the head pipe and supports a side mirror; and an electric component supported on a side mirror support section of the support member.

In accordance with this configuration, since the electric component can be placed in the space formed in the vicinity of the side mirror support section of the support member, this space can be efficiently utilized. In addition, it becomes easier to ensure the space in which other electric components or devices mounted to the vehicle body are placed, in the space defined by the vehicle body frame. As a result, it becomes possible to more flexibly design the layout of the components and the devices which are mounted to the vehicle body, in the straddle-type vehicle.

As should be appreciated from the above, in accordance with the present invention, it becomes possible to more flexibly design the layout of the components and the devices which are mounted to the vehicle body, in the straddle-type vehicle.

The above and further objects, features, and advantages of the present invention will more fully be apparent from the following detailed description of preferred embodiment with accompanying drawings.

DETAILED DESCRIPTION OF THE EMBODIMENTS

Hereinafter, the embodiment of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction of a vehicle body corresponds with a rightward and leftward direction.

[Configuration of Motorcycle]

Figure 1:
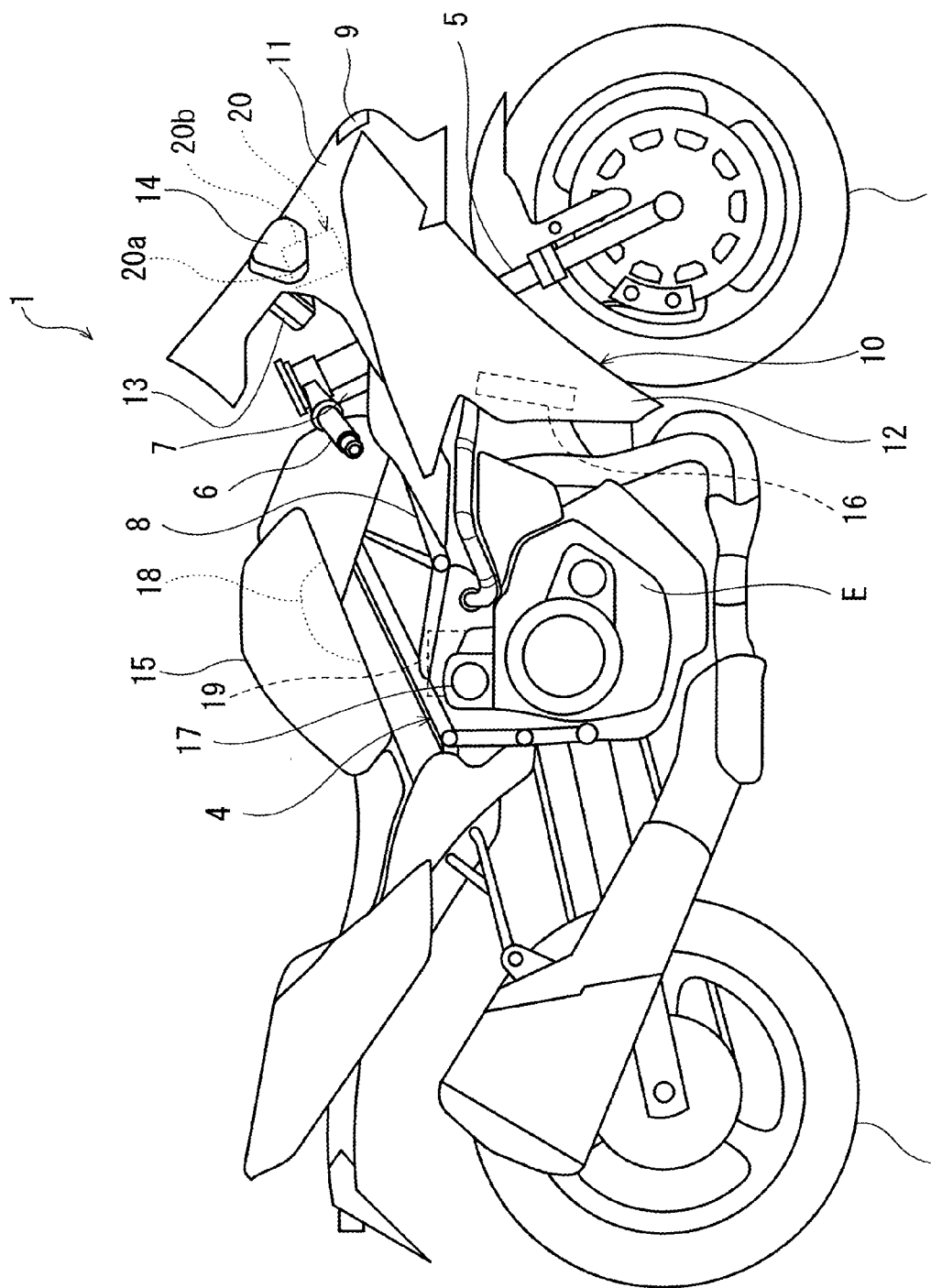
FIG. 1 is a right side view showing a motorcycle which is an exemplary straddle-type vehicle according to an embodiment.

FIG. 1 is a right side view showing a motorcycle 1 which is an exemplary straddle-type vehicle according to the embodiment. As shown in FIG. 1, the motorcycle 1 includes a front wheel 2 which is a driven wheel, a rear wheel 3 which is a drive wheel, and a vehicle body frame 4 placed between the front wheel 2 and the rear wheel 3. The front wheel 2 is rotatably connected to the lower end portion of a front fork 5 extending substantially vertically. A steering handle 6 extending in the rightward and leftward direction is rotatably attached to the upper end portion of the front fork 5 via a steering shaft (not shown). The vehicle body frame 4 includes a head pipe 7, a front frame 8 extending rearward from the head pipe 7, and a rear frame (not shown) extending rearward from the rear end of the front frame 8 and supporting a seat and the like. A head lamp unit 9 is placed in front of the head pipe 7.

The motorcycle 1 includes a cowling 10 mounted to the vehicle body frame 4. The cowling 10 includes a front cowling 11 and a pair of side cowlings 12. The front cowling 11 covers the head lamp unit 9 from an upper side. The side cowlings 12 cover the head lamp unit 9 from the side, the upper portion of the front fork 5 from the side, the head pipe 7 from the side, and the front frame 8 from the side. In this way, the side cowlings 12 cover the front portion of the vehicle body of the motorcycle 1, from outside, in the vehicle width direction. A meter device 13 and a pair of right and left side mirrors 14 are placed above the side cowlings 12.

The motorcycle 1 includes an engine (motor) E placed between the front wheel 2 and the rear wheel 3, and below the front frame 8. The engine E is an exemplary driving power source which rotates the rear wheel 3 and generates driving power for moving the vehicle body of the motorcycle 1. The engine E is mounted to the front frame 8. A fuel tank 15 is placed above the engine E. A radiator 16 is placed in front of the engine E to cool with air the coolant used for the engine E, the temperature of which is raised by heat radiated from the engine E. The side cowlings 12 include portions located in front of the radiator 16, and serve to guide the air passing through a region between the side cowlings 12 to the radiator 16.

In the present embodiment, a supercharger 17 is mounted to the engine E to compress the air to be supplied to the engine E. Since the supercharger 17 incorporated into the motorcycle 1 can supply the compressed air to the engine E, the output of the engine E can be increased. An intake chamber 18 which stores the compressed air sent from the supercharger 17 is placed below the fuel tank 15. The compressed air stored in the intake chamber 18 is supplied to the engine E. An intake duct (not shown) for guiding the intake air from outside is connected to the supercharger 17. Since the motorcycle 1 including the supercharged engine E (the engine E with the supercharger 17) includes the intake duct, the supercharger 17, and the intake chamber 18, the components mounted in the motorcycle 1 are more than those of a motorcycle which includes an unsupercharged engine (engine without a supercharger).

An air cleaner box 19 is placed upstream of the supercharger 17 in an airflow direction. For example, the air cleaner box 19 is placed between the intake duct and the supercharger 17. The air is introduced from outside through the intake duct and passes through a filter element of the air cleaner box 19, and the resulting clean air is supplied to the supercharger 17.

The engine E is controlled by a control device (ECU) 20. Specifically, the control device 20 is configured to control the ignition timings of the engine E, the fuel injection amounts of injectors, other vehicle states, etc. The control device 20 is placed in front of the head pipe 7. The control device 20 is placed inward in the vehicle width direction relative to the cowling 10 (front cowling 11), and above the side cowling 12. The control device 20 is placed above the upper end of the radiator 16.

Figure 2:
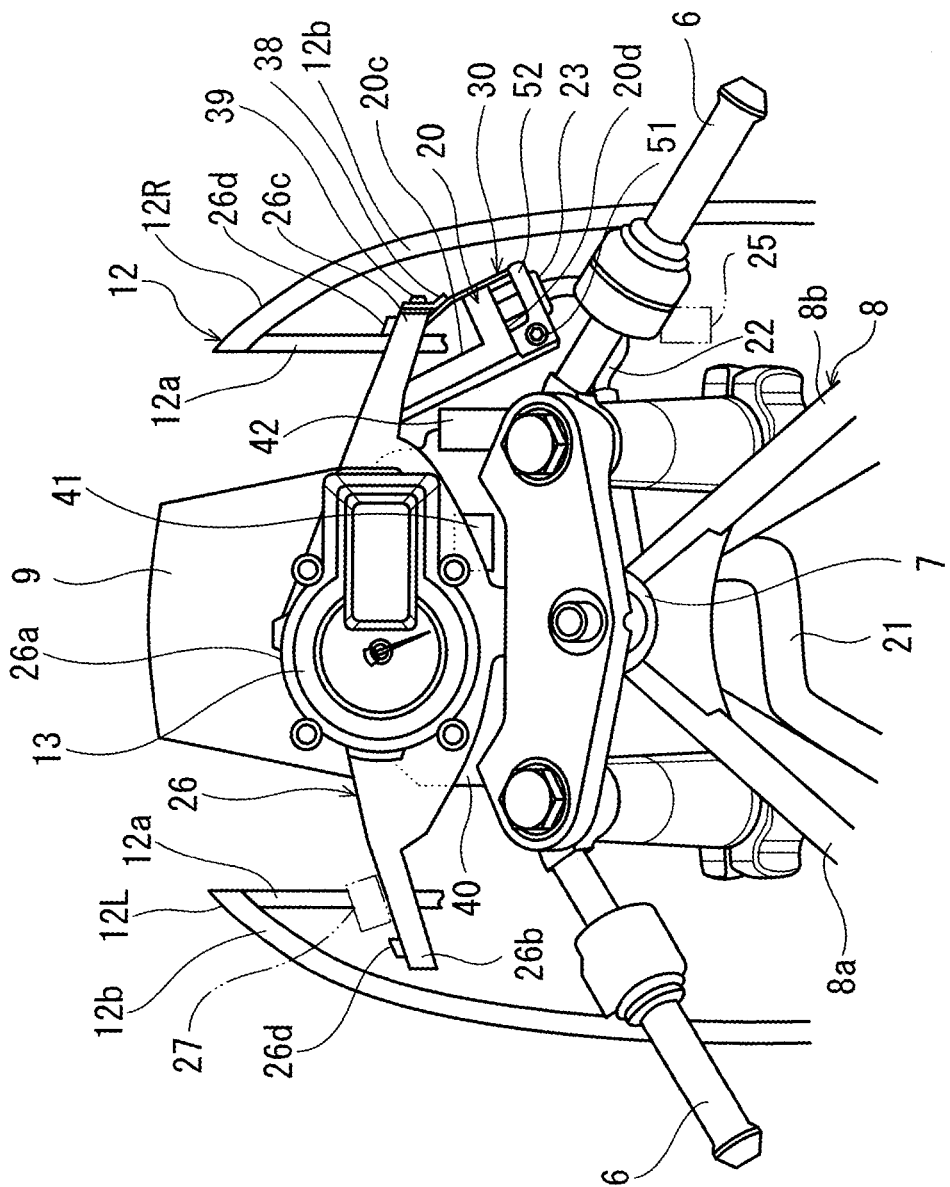
FIG. 2 is a plan view showing the front portion of a vehicle body of the motorcycle in a state in which a front cowling of FIG. 1 is detached from the vehicle body.

FIG. 2 is a plan view showing the front portion of the vehicle body of the motorcycle 1 in a state in which the front cowling 11 of FIG. 1 is detached from the vehicle body. For easier understanding, the side mirrors 14 are omitted from FIG. 2. As shown in FIG. 2, in the front portion of the vehicle body, the side cowlings 12 are provided on the right and left sides of the head lamp unit 9, respectively. More specifically, the side cowlings 12 include a pair of right and left side cowlings 12R, 12L. Each of the pair of right and left side cowlings 12R, 12L includes an inner panel 12a, and an outer panel 12b which forms an inner space together with the inner panel 12a and covers the inner panel 12a from outside in the vehicle width direction. The front end portion of the inner panel 12a is coupled to the front end portion of the outer panel 12b. The inner panel 12a is located inward in the vehicle width direction relative to the outer panel 12b and extends in a forward and rearward direction. The outer panel 12b has a stream-line shape. More specifically, the outer panel 12b swells outward in the vehicle width direction, as the outer panel 12b extends rearward. The shape of the outer panel 12b can reduce a driving resistance to the vehicle body. The pair of right and left side cowlings 12R, 12L face each other, forming spaces with the head lamp unit 9 in the vehicle width direction. The dimensions of the spaces formed between the pair of side cowlings 12R, 12L and the head lamp unit 9 increase as the spaces extend rearward.

As in the outer panel 12b, the front cowling 11 has a stream-line shape which swells outward in the vehicle width direction, as the front cowling 11 extends rearward. The front cowling 11 is coupled to the side cowlings 12. The control device 20 extends to be inclined outward in the vehicle width direction as the control device 20 extends rearward. Because of the shape of the control device 20, the control device 20 is easily placed inward relative to the front cowling 11 having the stream-line shape.

The control device 20 has a substantially rectangular plate shape having long sides, short sides and thickness sides. As shown in FIGS. 1 and 2, a surface 20a of the control device 20, which is perpendicular to the long sides, is inclined downward as the surface 20a extends rearward, while a surface 20b of the control device 20, which is perpendicular to the short sides, is inclined forward as the surface 20b extends downward. A surface 20c of the control device 20, which is perpendicular to the thickness sides, is inclined outward (in the present embodiment, rightward) in the vehicle width direction as the surface 20c extends rearward along the right side cowling 12R (see FIG. 2).

The front frame 8 includes a pair of left and right frame members 8a, 8b which extend rearward from the head pipe 7 to be spaced apart from each other in the rightward and leftward direction. A main harness 21 extends in the forward and rearward direction along the left frame member 8a of the front frame 8. The control device 20 is placed on an opposite side (right side) in the vehicle width direction with respect to the main harness 21 extending in the forward and rearward direction. A cable 22 connected to the control device 20 is merged into the main harness 21. The cable 22 includes a connector 23 at a tip end thereof. The connector 23 is connected to a connector connection surface 20d of the control device 20 facing rearward.

In the present embodiment, the motorcycle 1 includes a side stand (not shown) placed on the other side (in the present embodiment, on the left side) in the vehicle width direction. In other words, the control device 20 is placed on an opposite side of the side stand in the vehicle width direction. The motorcycle 1 incorporates, as a brake unit, an ABS (anti-lock brake system), which is configured to automatically reduce the hydraulic pressure of the brake, in order to avoid a lock of the wheel. An ECU 25 for the ABS is placed below the right handle 6 to control the ABS. In other words, the control device 20 is placed to be close to another control device (the ECU 25 for the ABS) in the vehicle width direction. The other control device is not limited to the ECU 25 for the ABS, and may be, for example, an ECU for an electronically-controlled suspension.

A support member 26 is placed in front of the head pipe 7. The support member 26 is made of metal such as aluminum alloy, and is fastened to the head pipe 7. The support member 26 includes a meter support section 26a. The meter support section 26a is placed at substantially the center portion of the support member 26 in the vehicle width direction. The meter support section 26a serves to fasten the meter device 13 by use of a fastener member (not shown) such as a bolt.

The support member 26 is formed with sections for supporting electric components at right and left end portions thereof, respectively. Specifically, the support member 26 is formed with a control device support section 26c on one side (in the present embodiment, on the right side) of the support member 26 in the vehicle width direction, and an antenna support section 26b on the other side (in the present embodiment, on the left side) of the support member 26 in the vehicle width direction. The control device support section 26c supports the control device 20. The antenna support section 26b supports an antenna 27 for an ETC (electronic toll collection system). The antenna support section 26b extends to the left continuously from the meter support section 26a. The antenna 27 is not limited to being an antenna for the ETC mounted in the motorcycle 1, so long as the antenna 27 is able to transmit and receive an electric wave.

The control device support section 26c extends to the right continuously from the meter support section 26a. In this way, the control device support section 26c is provided at the end portion of the support member 26 on one side in the vehicle width direction. The control device 20 is fastened to the control device support section 26c via a mounting member 30.

The antenna support section 26b and the control device support section 26c are formed with mirror fastening sections 26d for supporting the side mirrors 14, respectively. The mirror fastening sections 26d protrude upward from the outer end portion of the antenna support section 26b and the outer end portion of the control device support section 26c in the vehicle width direction, respectively. The mirror fastening sections 26d are placed to overlap with the antenna support section 26b and the control device support section 26c, respectively, when viewed from above. The side mirrors 14 are fastened to the mirror fastening sections 26d via fastener members such as bolts, respectively. In this way, the antenna support section 26b and the control device support section 26c also serve as side mirror support sections for supporting the side mirrors 14, respectively. The control device 20 is placed in a space in the vicinity of the control device support section (side mirror support section) 26c, in the space in the vehicle width direction, which is formed between the front cowling 11 and the head lamp unit 9.

Figure 3:
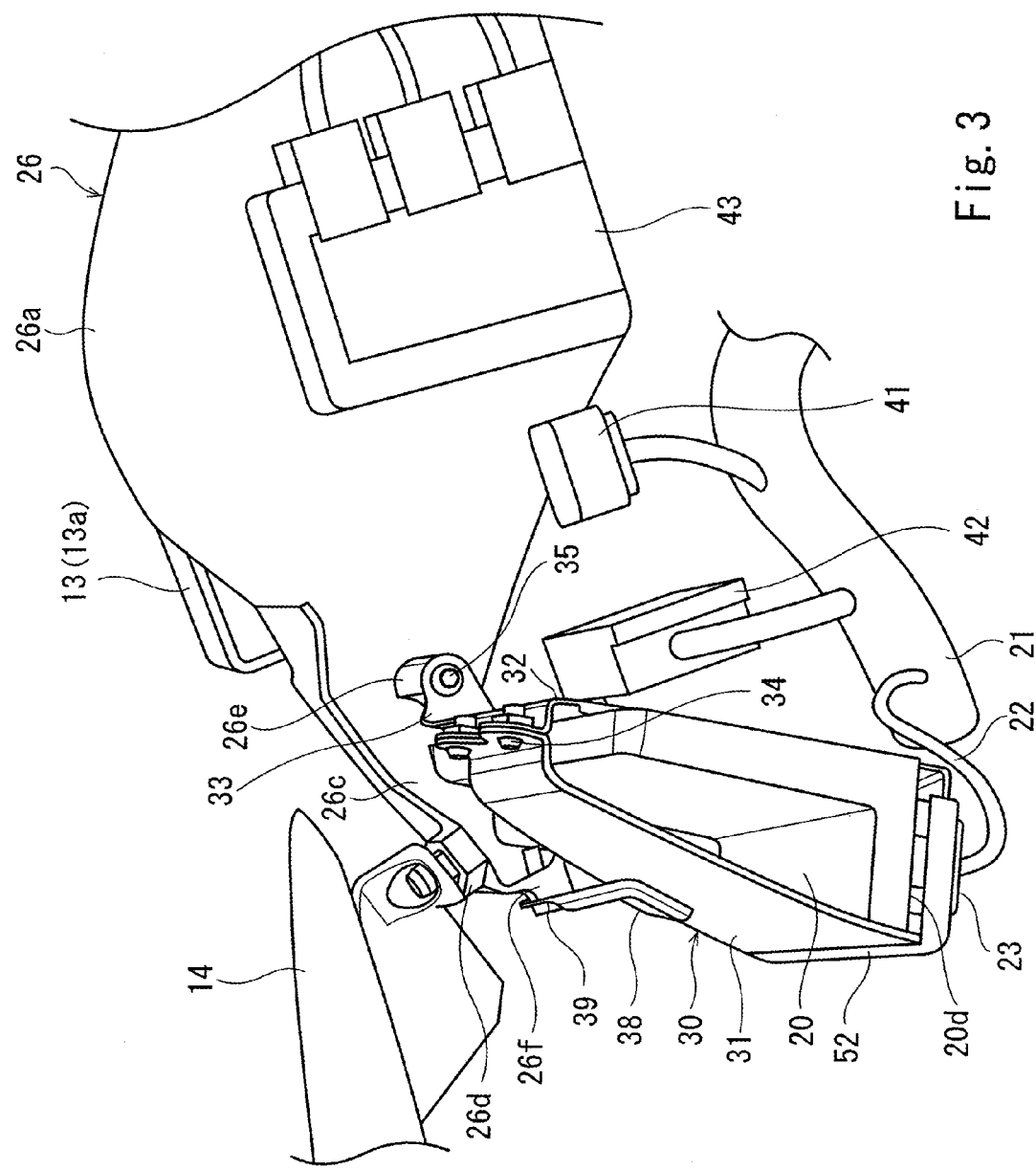
FIG. 3 is a perspective view showing a portion of a support member of FIG. 2 and a region in the vicinity of a control device of FIG. 2, when viewed from the reverse side of the support member which is on an opposite side of the display surface of a meter device.

FIG. 3 is a perspective view showing a portion of the support member 26 of FIG. 2 and a region in the vicinity of the control device 20 of FIG. 2, when viewed from the reverse side of the support member 26 which is on an opposite side of the display surface 13a of the meter device 13. As shown in FIG. 3, the mounting member 30 includes a first metal mounting member 31 and a second metal mounting member 32. The first metal mounting member 31 and the second metal mounting member 32 are plate members, respectively, and cover the control device 20 from the right and the left. Thus, the control device 20 is supported in a state in which the control device 20 is sandwiched between two plate members from the right and left sides. The first metal mounting member 31 and the second metal mounting member 32 are fastened to each other via fastener members 34 (e.g., bolts and nuts), in front of the control device 20. A fastening member 33 is fastened to the second metal mounting member 32. The fastening member 33 is fastened to the support member 26 via a fastener member 35 (e.g., a bolt). Note that the second metal mounting member 32 and the fastening member 33 may be integrated.

The control device support section 26*c* includes a boss 26*e* protruding downward from the reverse surface of the control device support section 26*c*. The boss 26*e* of the control device support section 26*c* is placed inward in the vehicle width direction relative to the control device 20, in a location below the mirror fastening section 26*d*. The inner peripheral surface of the boss 26*e* is formed with a threaded groove. The fastener member 35 is inserted into the threaded groove of the boss 26*e* to fasten the fastening member 33 to the support member 26. The fastener member 35 is a special bolt having a head portion different from that of a predetermined industrial standard (JIS, etc.). For this reason, it is difficult to loosen this bolt (the fastener member 35) by use of a general tool which is commercially available. The fastening member 33 is fastened to the support member 26 by use of a special tool. In this way, the second metal mounting member 32 is fastened to the support member 26 in a location that is inward in the vehicle width direction relative to the control device 20, via the fastening member 33 and the fastener member (bolt) 35.

A fastening member 38 of a plate shape is fastened to the outside surface of the first metal mounting member 31 in the vehicle width direction. The fastening member 38 is fastened to the outer end portion 26*f* of the control device support section 26*c* in the vehicle width direction by use of a bolt 39. In this way, the first metal mounting member 31 is fastened to the support member 26 via the fastening member 38 and the bolt 39. Note that the first metal mounting member 31 may be integrated with the fastening member 38. In the above configuration, the first metal mounting member 31 and the second metal mounting member 32, which are the two plate members, are fastened to the support member 26, by use of the bolts 35, 39, respectively.

The connector 23 is connected to the control device 20 from the rear. The upper and lower surfaces of the connector 23 are partially closed by a fastening member 52 fastened to the mounting member 30 via a bolt 51, or the like.

Figure 4:
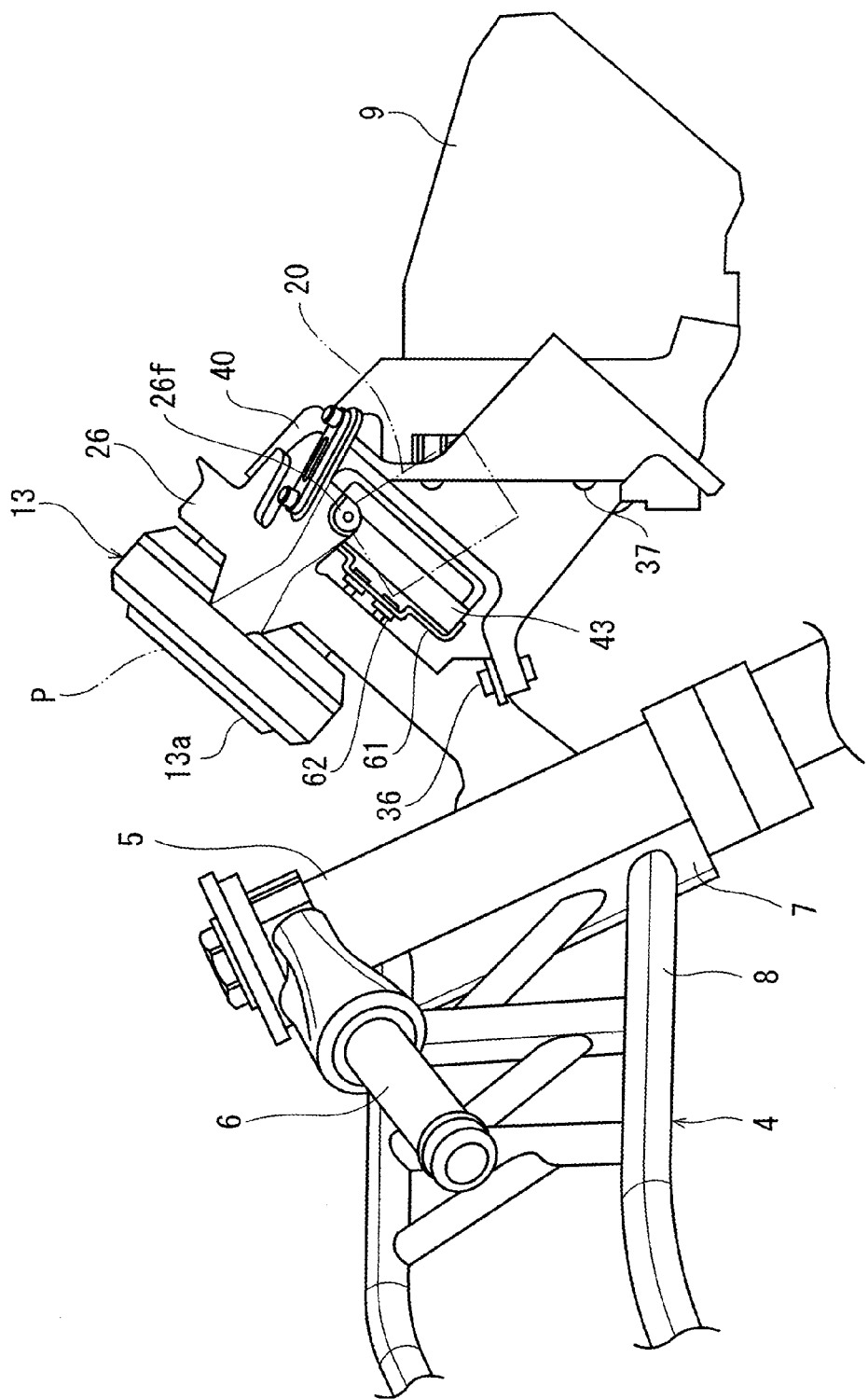
FIG. 4 is a right side view showing the front portion of the vehicle body of the motorcycle in a state in which side cowlings of FIG. 2 are detached from the vehicle body.

FIG. 4 is a right side view showing the front portion of the vehicle body of the motorcycle 1 in a state in which the side cowlings 12 of FIG. 1 are detached from the vehicle body. As shown in FIG. 4, the head lamp unit 9 is placed below the support member 26. The control device 20 is located rearward relative to the head lamp unit 9. A part of the control device 20 is located below the upper end portion of the head lamp unit 9 and above the lower end portion of the head lamp unit 9. The upper end portion of the control device 20 is located below the upper end portion of the meter device 13.

In the forward and rearward direction, the control device 20 is placed in front of the handle 6 and in front of the upper portion of the front fork 5 which is substantially as high as the handle 6. Further, the control device 20 is placed in front of a virtual plane P including the display surface 13*a* of the meter device 13.

A bracket 40 is placed between the support member 26 and the head lamp unit 9 in a vertical direction. The bracket 40 is fastened to the support member 26 by a bolt 36 and to the head lamp unit 9 by a bolt 37. The bracket 40 is made of, for example, a resin. Electric components which are different from the control device 20 and the antenna 27 for the ETC are fastened to the bracket 40. Specifically, an immobilization amplifier 41 and a fuse box 42 are fastened to the bracket 40 in locations that are close to the control device 20 (see FIG. 2).

The immobilization amplifier 41 is incorporated into an immobilizer (not shown) which is a theft-prevention device of a vehicle. When an ID code contained in a signal transmitted from a transmitter buried in a special key matches an ID code unique to the vehicle body in verification between the two, the immobilizer sends an immobilization signal from a switching circuit to the control device 20. The immobilization amplifier 41 serves to amplify the immobilization signal output from the switching circuit. The fuse box 42 is a box attached with a fuse melted and disconnected to cut off a current flowing to the control device 20, when an excess current of a specified value or larger flows through a cable.

The immobilization amplifier 41 and the fuse box 42 are placed rearward relative to the head lamp unit 9 and between the support member 26 and the bracket 40 in the vertical direction. The immobilization amplifier 41 and the fuse box 42 are placed inward in the vehicle width direction relative to the control device 20 and electrically connected to the control device 20 via cables branching from the main harness 21 (see FIG. 3). Since the immobilization amplifier 41 is electrically connected to the control device 20, the control device 20 is capable of controlling the operation of the immobilizer. Alternatively, other electric components such as an ECU for a steering damper, and a tilting sensor may be fastened to the bracket 40.

The ECU for the steering damper is a control device which electronically controls the steering damper. The ECU for the steering damper is configured to control an oil pressure inside of the steering damper so that the steering damper performs a proper damping function, according to the driving state of the motorcycle 1 which is determined based on a signal output from a vehicle speed sensor, etc. This makes it possible to improve steering stability. The tilting sensor is configured to detect that the vehicle body is banked to a specified angle or larger, and send a detection signal indicating the bank state of the vehicle body to the control device of the engine. The control device of the engine stops the engine in response to the detection signal received from the tilting sensor.

As shown in FIGS. 3 and 4, a connection member (connection body) 43 of a plate shape is placed on the reverse surface of the support member 26 which is on an opposite side of the display surface 13*a* of the meter device 13, along the meter device 13. The connection member 43 is defined as an electric component electrically connected to the control device 20 via a harness. In the present embodiment, the connection member 43 is the electric component different from the control device 20, the antenna 27 for the ETC, the immobilization amplifier 41 and the fuse box 42. Specifically, the connection member 43 is a relay box. The connection member 43 is not limited to the relay box, and may be any one of a relay, a fuse, a fuse box, a control device (e.g., ABS control unit) other than the control device 20, a sensor, etc.

The relay box 43 is fastened to the reverse surface of the support member 26 which is on an opposite side of the meter device 13, by a mounting metal 61 and fastener members (e.g., bolts and nuts) 62. The relay box 43 is attached with a plurality of (in the present embodiment, three) relays used to supply the electric power to other electric components via a harness 28 (see FIG. 5) in response to a signal output from the control device 20.

Figure 5:
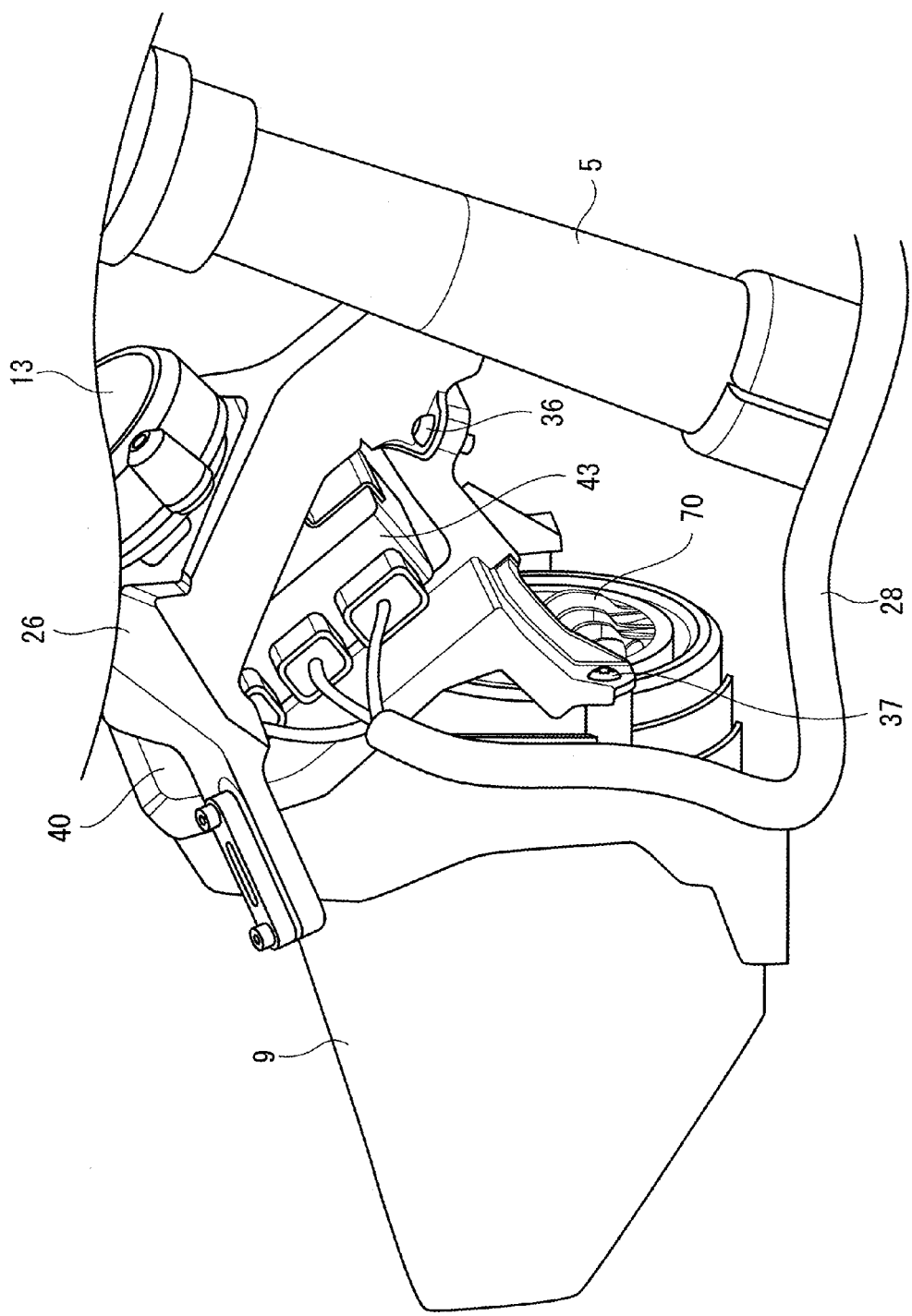
FIG. 5 is a perspective view showing a region in the vicinity of a head lamp unit of FIG. 4, when viewed from the left in a vehicle width direction.

FIG. 5 is a perspective view showing a region in the vicinity of the head lamp unit 9 of FIG. 4, when viewed from the left in the vehicle width direction. As shown in FIG. 5, the cables of the harness 28 are connected to the relay box 43. The harness 28 is merged into the main harness 21, and thus the relay box 43 is electrically connected to the control device 20. The rear portion of the head lamp unit 9 is provided with a heat sink 70. The heat sink 70 serves to radiate heat radiated from a wiring board which is mounted in the head lamp unit 9 and is a heat source. The bracket 40 is positioned on a straight line connecting the relay box 43 to the heat sink 70.

The motorcycle 1 which is an exemplary straddle-type vehicle, configured as described above, can obtain the following advantages.

The number of associated devices and devices mounted to the vehicle body tends to increase to realize higher functions of the straddle-type vehicle such as the motorcycle. As examples of the devices mounted to the vehicle body, there are an evaporator, an ABS unit, an electronically-controlled steering damper, an electronically-controlled suspension, a supercharger, exhaust valves, a variable valve mechanism for changing the timings when intake and exhaust valves are opened and closed, an electric motor as a driving power source of driving power for moving the vehicle body, an electronic control throttle, an ETC device, and sensors. Further, there has been a demand for an increase in the size of the devices (e.g., an air cleaner or a fuel tank) placed in a space defined by the vehicle body frame. Under the circumstances, it is difficult to design the layout of the components and the devices which are mounted to the vehicle body, in the straddle-type vehicle which is limited in the space in which the devices are placed. However, in the present embodiment, since the control device 20 which controls the engine E is placed in front of the head pipe 7, it becomes easier to ensure the space in which the above devices and the electric components required to mount the above devices to the vehicle body are placed, in the space defined by the vehicle body frame 4. As a result, it becomes possible to more flexibly design the layout of the components and the devices which are mounted to the vehicle body, in the motorcycle 1.

In the present embodiment, the engine E of the motorcycle 1 is a supercharged engine including the supercharger 17. Therefore, the motorcycle 1 including the supercharged engine E is required to incorporate the intake chamber 18 and the intake duct, in addition to the supercharger 17. The motorcycle 1 including the supercharged engine E incorporates more components and devices than a motorcycle including an unsupercharged engine (engine without a supercharger) does, which makes it difficult to flexibly design the layout of the components and the devices which are mounted to the vehicle body. In the present embodiment, the control device 20 and a portion of the electric components (the immobilization amplifier 41, the fuse box 42, the relay box 43, etc.) are placed in front of the head pipe 7. This makes it possible to increase the space defined by the vehicle body frame 4, in a location that is rearward relative to the head pipe 7. As a result, it becomes possible to more flexibly design the layout of the components and the devices which are mounted to the vehicle body, in the motorcycle 1.

Since the motorcycle 1 incorporates the supercharger 17, the output of the engine E is increased, and correspondingly, the temperature of the heat radiated from the engine E is increased. Since the control device 20 is fastened to the support member 26 placed in front of the head pipe 7, a temperature increase in the control device 20 which is caused by the heat radiated from the engine E can be suppressed.

The motorcycle 1 is rear-wheel-drive, and the front wheel 2 is the driven wheel. For this reason, it is necessary to increase a load distributed to the front wheel 2. Since the control device 20 is placed in front of the head pipe 7, the load distributed to the front wheel 2 can be increased. Further, because of the increase in the load distributed to the front wheel 2, the stability of the motorcycle 1 incorporating the supercharger 17 can be improved.

In the present embodiment, since the control device 20 is fastened to the support member 26 placed in front of the head pipe 7, the control device 20 can be made distant from the engine E, and is less likely to be affected by the heat radiated from the engine E. This makes it possible to suppress a temperature increase in the control device 20. In addition, it becomes possible to more flexibly design the layout of the components and the devices which are mounted to the vehicle body, in the motorcycle 1.

Since the control device 20 is placed in the space in the vicinity of the control device support section (side mirror support section) 26c of the support member 26, this space can be efficiently utilized.

To ensure the space in which the control device 20 is placed, in a location that is lateral relative to the air cleaner box 19, it is necessary to reduce the size of the air cleaner box 19, for example, by reducing the dimension of the air cleaner box 19 in the vehicle width direction. However, it is desirable to make the volume of the air cleaner box 19 as large as possible, to ensure the amount of the air supplied to the engine E. In the present embodiment, since the control device 20 is placed in front of the head pipe 7, the volume of the air cleaner box 19 can be ensured without reducing the size of the air cleaner box 19.

Since the control device 20 is placed above the right side cowling 12R, the control device 20 is distant from the engine E in the vertical direction. In this layout, the effects of heat of the engine E on the control device 20 can be suppressed more effectively.

The control device 20 is fastened to the control device support section 26c of the support member 26 via the mounting member 30. The bolt 35 used to fasten the fastening member 33 of the mounting member 30 to the control device support section 26c is fastened by use of the special tool. This makes it possible to prevent a third party from detaching the control device 20 from the vehicle body, even in a case where the third party detaches the side cowling 12.

The control device 20 is supported in a state in which the control device 20 is sandwiched between the first metal mounting member 31 and the second metal mounting member 32 which are the two plate members, from the right and the left. Since it is difficult to detach the control device 20 in this configuration, it becomes possible to prevent the third party from detaching the control device 20 from the vehicle body. Since the first metal mounting member 31 and the second metal mounting member 32 are fastened via the fastener members 34, in front of the control device 20, and the second metal mounting member 32 is fastened to the support member 26 via the fastening member 33 and the fastener member 35 in the location that is inward in the vehicle width direction relative to the control device 20, in this layout, it is difficult for the third party to access the fastener members 34, 35 from the rear of the control device 20. Therefore, it becomes possible to prevent the third party from detaching the fastener members 34, 35.

The control device 20 has the substantially rectangular shape with the long sides, the short sides, and the thickness sides. The surface 20a of the control device 20, which is perpendicular to the long sides, is inclined downward as the surface 20a extends rearward, while the surface 20b of the control device 20, which is perpendicular to the short sides, is inclined forward as the surface 20b extends downward. Also, the surface 20c of the control device 20 which is perpendicular to the thickness sides, is inclined outward in the vehicle width direction as the surface 20c extends rearward along the outer panel 12b of the right side cowling 12R. Because of the shape of the control device 20, the electric component other than the control device 20 can be easily placed in the location that is inward in the vehicle width direction relative to the control device 20, in the space formed between the vehicle body and the outer panel 12b of the right side cowling 12R. In the present embodiment, the relay box 43 is fastened to the support member 26. In this way, the space formed between the vehicle body and the right side cowling 12R can be efficiently utilized.

The support member 26 is made of metal such as aluminum alloy. By use of the fastener members 34, 35, the control device 20 and the mounting member 30 can be firmly fastened to the support member 26. Thus, it becomes possible to prevent the third party from detaching the control device 20 from the vehicle body. Since the support member 26 is fastened to the head pipe 7 of the vehicle body frame 4, independent of the steering handle 6, the rider can easily perform a steering operation.

Since the meter device 13 and the control device 20 are fastened to the support member 26 which is a common member, the number of components can be reduced. In addition, since the side mirrors 14 are fastened to the support member 26, the number of components can be further reduced.

Since the support member 26 is formed with the section (the control device support section 26c) for supporting the control device 20 at the end portion on one side (in the present embodiment, right side) in the vehicle width direction, the control device 20 can be placed in the location that is outward in the vehicle width direction, and thus an interference between the control device 20 and other components can be prevented.

The side mirrors 14 are mounted to the right and left end portions of the support member 26. The section (the control device support section 26c) of the support member 26, the section supporting the control device 20, is placed to overlap with the section (mirror fastening section 26d) of the support member 26, the section supporting the side mirror 14, when viewed from above. In this layout, the control device 20 can be placed in the location that is outward in the vehicle width direction, and can be located to be distant from the engine E in the vehicle width direction. Therefore, the effects of heat of the engine E on the control device 20 can be suppressed more effectively.

Since the relay box 43 electrically connected to the control device 20 is fastened to the support member 26, it becomes easier to ensure the space in which other electric components and devices mounted to the vehicle body are placed, in the location that is rearward relative to the head pipe 7, in the space defined by the vehicle body frame 4.

The relay box 43 of the plate shape is placed on the reverse surface of the support member 26 which is on an opposite side of the display surface 13a of the meter device 13, along the meter device 13. In this way, the relay box 43 can be fastened to the support member 26 in a compact manner.

Since the bracket 40 is placed between the support member 26 and the head lamp unit 9 in the vertical direction, it becomes easier to ensure the space in which other electric components and devices mounted to the vehicle body are placed, in the location that is rearward relative to the head pipe 7, in the space defined by vehicle body frame 4. Therefore, the space defined by the vehicle body frame 4 can be efficiently utilized. As a result, it becomes possible to more flexibly design the layout of the components and the devices which are mounted to the vehicle body, in the motorcycle 1.

The immobilization amplifier 41 and the fuse box 42 are attached to the bracket 40. Since the immobilization amplifier 41 and the fuse box 42 are attached to the bracket 40 in the locations that are close to the control device 20, the immobilization amplifier 41 and the fuse box 42 can be easily connected to the control device 20. Specifically, the length of the cables branching from the main harness 21 and electrically connecting the immobilization amplifier 41 and the fuse box 42 to the control device 20 can be reduced, or a current flowing from the control device 20 to the immobilization amplifier 41 and the fuse box 42 can fall into a specified current range to prevent an excess current from flowing therethrough.

The bracket 40 is made of a resin, and placed on a straight line connecting the heat sink 70 of the head lamp unit 9 to the relay box 43. In this layout, the bracket 40 can lessen the effects of heat emitted from the heat sink 70 on the relay box 43. Thus, a temperature increase in the relay box 43 can be suppressed. Since the electric components such as the immobilization amplifier 41 and the fuse box 42 are attached to the bracket 40, temperature increases in the electric components attached to the bracket 40 can be suppressed as well.

The present invention is not limited to the above-described embodiment. The above-described configuration may be changed, added to or deleted from, within a scope of the spirit of the present invention. Although in the above-described embodiment, the control device (ECU) 20 for controlling the engine E is supported on the control device support section (side mirror support section) 26c of the support member 26, other electric components, for example, other ECUs (an ECU for the ABS, an ECU for the electronically-controlled suspension, or the like), a relay, a fuse, a regulator, etc., may be fastened to the control device support section (side mirror support section) 26c of the support member 26. The control device 20 may be placed in front of the meter device 13 to be made more distant from the engine E in the forward and rearward direction. The control device 20 may be placed on the left side of the vehicle body. The control device 20 and the main harness 21 may be placed on the same side in the vehicle width direction. Although in the above-described embodiment, the relay box 43 is fastened to the support member 26, the relay box 43 may be fastened to the bracket 40. The antenna 27 for the ETC need not be fastened to the end portion of the support member 26 on the other side in the vehicle width direction. Instead, only the control device 20 may be fastened to the end portion of the support member 26 on one side in the vehicle width direction.

Although in the above-described embodiment, the motorcycle 1 incorporates the supercharged engine E, the motorcycle 1 may incorporate an unsupercharged engine (engine without a supercharger). Although in the above-described embodiment, the motorcycle 1 incorporates the engine E as the motor, the motor may be an electric motor instead of the engine E. In other words, the motorcycle 1 may be an electrically-powered vehicle. Further, in a case where the number of the components and devices mounted to the vehicle body is increased or a large-sized component or device is mounted to the vehicle body, by incorporating, for example, as an ABS control unit, an electronically-controlled throttle device, or an evaporative gas canister, the present invention can provide the space for the incorporated device, in the space defined by the vehicle body frame 4. Further, even in a case where the number or structure of the components mounted to the vehicle body is not changed, the layout of these components can be easily changed because the layout of the components and devices mounted to the vehicle body can be designed more flexibly. Further, the motorcycle 1 may be a sport-type motorcycle, an American-type motorcycle, a scooter-type motorcycle, etc. Moreover, the straddle-type vehicle is not limited to the motorcycle 1, and may be, for example, an ATV (all-terrain vehicle), a small truck, etc.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A straddle-type vehicle comprising:
a head pipe;
a vehicle body frame extending rearward from the head pipe;
an engine which is mounted to the vehicle body frame and generates driving power for moving a vehicle body;
a support member which is placed in front of the head pipe and supports a side mirror;
an electric control unit supported on a side mirror support section of the support member; and
a meter device fastened to the support member,
wherein the electric control unit is placed outside of the meter device in a vehicle width direction.

2. A straddle-type vehicle comprising:
a vehicle body frame including a head pipe, and a front frame extending rearward from the head pipe;
an engine placed below the front frame and supported on the front frame;
a control device which controls the engine;
a support member placed in front of the head pipe, the control device being fastened to the support member;
a meter device fastened to the support member,
wherein the control device is placed in front of a virtual plane including a display surface of the meter device; and
wherein a surface of the control device is inclined outward in a vehicle width direction as the surface of the control device extends rearward, the surface of the control device being perpendicular to thickness sides of the control device.

3. A straddle-type vehicle comprising:
a vehicle body frame including a head pipe, and a front frame extending rearward from the head pipe;
an engine placed below the front frame and supported on the front frame;
a control device which controls the engine;
a support member placed in front of the head pipe, the control device being fastened to the support member;
a meter device fastened to the support member,
wherein the control device is placed in front of a virtual plane including a display surface of the meter device; and
wherein the support member has a meter support section to which the meter device is fastened and a control device support section to which the control device is supported, the control device support section extending outward in a vehicle width direction relative to the meter support section.

4. A straddle-type vehicle comprising:
a vehicle body frame including a head pipe, and a front frame extending rearward from the head pipe;
an engine placed below the front frame and supported on the front frame;
a control device which controls the engine;
a support member placed in front of the head pipe, the control device being fastened to the support member;
a meter device fastened to the support member,
wherein the control device is placed in front of a virtual plane including a display surface of the meter device;
a side mirror, wherein the control device is placed in a space in a vicinity of a mirror fastening section of the support member to which the side mirror is fastened; and
wherein a control device support section of the support member is placed to overlap with the mirror fastening section of the support member when viewed from above.

5. A straddle-type vehicle comprising:
a vehicle body frame including a head pipe, and a front frame extending rearward from the head pipe;
an engine placed below the front frame and supported on the front frame;
a control device which controls the engine;
a support member placed in front of the head pipe, the control device being fastened to the support member;
a meter device fastened to the support member,
wherein the control device is placed in front of a virtual plane including a display surface of the meter device; and
wherein the control device is placed outside of the meter device in a vehicle width direction.

6. A straddle-type vehicle comprising:
a vehicle body frame including a head pipe, and a front frame extending rearward from the head pipe;
an engine placed below the front frame and supported on the front frame;
a control device which controls the engine;
a support member placed in front of the head pipe, the control device being fastened to the support member;
a meter device fastened to the support member,
wherein the control device is placed in front of a virtual plane including a display surface of the meter device; and further comprising a side mirror,
wherein the control device is placed between the meter device and a side mirror.

7. A straddle-type vehicle comprising:
a vehicle body frame including a head pipe, and a front frame extending rearward from the head pipe;
an engine placed below the front frame and supported on the front frame;
a control device which controls the engine;
a support member placed in front of the head pipe, the control device being fastened to the support member;

a meter device fastened to the support member,
wherein the control device is placed in front of a virtual plane including a display surface of the meter device; and further comprising a head lamp unit,
wherein the control device is placed outside of the head lamp unit in a vehicle width direction.

\* \* \* \* \*